United States Patent [19]
Murdock

[11] Patent Number: 5,373,566
[45] Date of Patent: Dec. 13, 1994

[54] NEURAL NETWORK-BASED DIACRITICAL MARKER RECOGNITION SYSTEM AND METHOD

[75] Inventor: Michael C. Murdock, Mesa, Ariz.

[73] Assignee: Motorola, Inc., Schaumburg, Ill.

[21] Appl. No.: 996,440

[22] Filed: Dec. 24, 1992

[51] Int. Cl.$^5$ .......................... G06K 9/34; G06K 9/62; G06K 7/00

[52] U.S. Cl. .......................................... 382/15; 382/9; 382/58

[58] Field of Search .................... 382/9, 13, 14, 15, 36, 382/48, 58, 65

[56] References Cited

U.S. PATENT DOCUMENTS

| | | | |
|---|---|---|---|
| 4,611,346 | 9/1986 | Bednar | 382/9 |
| 4,887,301 | 12/1989 | Hodgens et al. | 382/9 |
| 5,058,170 | 10/1991 | Denker et al. | 382/14 |

Primary Examiner—Joseph Mancuso
Assistant Examiner—David Fox
Attorney, Agent, or Firm—Harold C. McGurk, IV; S. Kevin Pickens

[57] ABSTRACT

A diacritical marker recognition system and method recognizes diacritical markers in a character image based upon an analysis by a neural network of the portion of the character image most likely to contain a diacritical marker. Once the neural network determines that a diacritical marker most likely exists in the character image, the system determines by using heuristics whether a diacritical marker exists or whether the character image appears to contain a diacritical marker which is actually a regular character.

11 Claims, 5 Drawing Sheets

NEURAL NETWORK-BASED DIACRITICAL MARKER RECOGNITION SYSTEM AND METHOD

TECHNICAL FIELD

This invention relates generally to systems and methods of optical character recognition and, in particular, to a diacritical marker recognition system and method which uses a multiple layer subsampling perceptron neural network for recognizing diacritical markers.

BACKGROUND OF THE INVENTION

All conventional optical character recognition (OCR) systems and methods are limited in the number of the characters which can be recognized. Conventional OCR systems have been built to recognize upper and lower case alphabetical characters, digits, and punctuation marks. Conventional character recognition systems and methods are unable to recognize diacritical markers, such as ä (umlaut), â (circumflex), a (tilde), ā (macron), a (dot above), and a (vector), for example. Diacritical markers are used frequently in dictionaries, technical documents, and scholarly scientific journals and publications, for example.

The reason conventional OCR systems cannot recognize diacritical markers is due to the difficulty in recognizing diacritical markers without negatively impacting the recognition rate of characters A–Z and a–z, digits 0–9, and punctuation marks, such as ",", ".", and "?", for example. In other words, there is a limit in the amount of characters, digits and punctuation marks which an OCR system can recognize. Once the OCR system passes this threshhold, the OCR system has a harder time discriminating between characters, digits, and punctuation marks and any diacritical marker. Therefore, the speed and efficiency of recognizing any of the common characters, digits, and punctuation marks substantially decreases.

Accordingly, there exists a significant need for a method which can recognize diacritical markers without negatively impacting the recognition rate of regular characters, digits and punctuation marks.

SUMMARY OF THE INVENTION

The present invention has utility in improving the recognition rate in document conversion by recognizing diacritical markers in addition to recognizing regular characters, digits and punctuation marks.

Thus it is an advantage of the present invention to recognize diacritical markers using a diacritical marker recognition system.

It is also an advantage of the present invention to recognize diacritical markers without reducing the speed and efficiency of recognizing other characters, digits, and punctuation marks.

According to one aspect of the invention, a diacritical marker recognition system is provided and is connectable to receive a raster image and bounding box information. The bounding box information specifies locations and dimensions of a rectangle surrounding characters in the raster image. The diacritical marker recognition system comprises extraction and normalization means for extracting a plurality of character images from the raster image based on the bounding box information; subsampling means for subsampling an upper and lower region of each of the normalized character images; neural network means for determining a probability of whether a diacritical marker may exist in each of the subsampled character images; and controller means for determining whether a diacritical marker exists in one of the character images based on the determining by the neural network means and heuristics.

According to another aspect of the invention, a diacritical marker recognition method is provided which is executed on a computer as part of a computer program for identifying if any character in a raster image contains a diacritical marker. The computer is connectable to receive a raster image and bounding box information. The bounding box information specifies locations and dimensions of a rectangle surrounding each character in the raster image. The method comprises the steps of: (a) extracting a plurality of character images from the raster image based on the bounding box information; (b) subsampling each of the normalized character images; (c) identifying if any of the subsampled character images has a diacritical marker by using a neural network; and (d) outputting the diacritical marker with the OCR character image if the diacritical marker is identified in step (d).

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DESCRIPTION OF THE PREFERRED EMBODIMENTS

Figure 1:
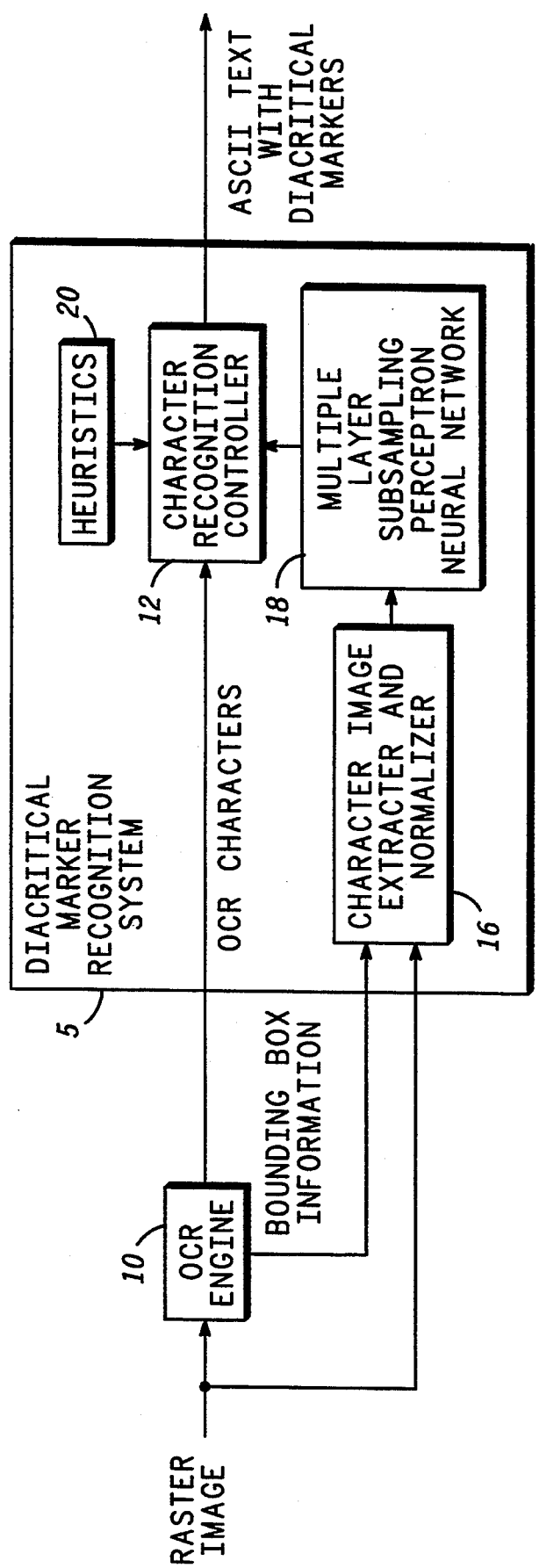
FIG. 1 shows a block diagram of a diacritical marker recognition system in accordance with a preferred embodiment of the invention.

A block diagram of a diacritical marker recognition (DMR) system 5 in accordance with a preferred embodiment of the present invention is shown in FIG. 1. Briefly, DMR system 5 shown in FIG. 1 comprises character recognition controller 12, character image extractor and normalizer 16, multiple layer subsampling perceptron neural network 18, and heuristics 20. Heuristics 20 are a collection of rules developed while exercising the prototype of the diacritical marker recognition system.

In FIG. 1, optical character recognition (OCR) engine 10 receives a raster image. The raster image may be an output from a commercially available scanner, such as those manufactured by Calera, for example. The scanner scans a page of a document and converts the page into a raster image which is an electronic representation of the actual page. After receiving the raster image, OCR engine 10 converts the text contained in the raster image into an OCR (ASCII) character stream.

OCR engine 10 also segments each of the raster images into OCR characters and provides bounding box information for each of the characters. The bounding box information comprises a location of a box or rectangle which surrounds a specific character in the raster image and dimensions of the bounding box such as height and width, for example. The purpose of OCR engine 10 is not to recognize diacritical markers but to recognize upper and lower case alphabetical characters such as A–Z and a–z, digits 0–9, and punctuation marks from the raster image. OCR engine 10 also flags any OCR character which it does not recognize. The resulting OCR character stream is sent to character recognition controller 12 which is responsible for combining and outputting the regular OCR (ASCII) characters with information as to whether any of the OCR characters also include a diacritical marker.

The bounding box information is transferred to character image extractor and normalizer 16 which extracts a character image from the raster image using the bounding box information provided by OCR engine 10. Character image extractor and normalizer 16 also normalizes the character image to a standard image size. The normalized character image is sent to multiple layer subsampling perceptron neural network 18 which tries to identify or determine if a diacritical marker exists in any of the character images. The determination by the neural network 18 for each of the character images is provided to the character recognition controller 12. Controller 12 determines whether a diacritical marker exists in any of the character images based on the results of neural network 18 and heuristics 20. If character recognition controller 12 determines that a diacritical marker exists, controller 12 outputs the diacritical marker along with the OCR (ASCII) character for which the diacritical marker is associated. For example, controller 12 may output the OCR character "a" with a flag that a circumflex (one of the recognized diacritical markers) is part of the character image. Otherwise, controller 12 just outputs the OCR character identified by OCR engine 10.

Figure 2:
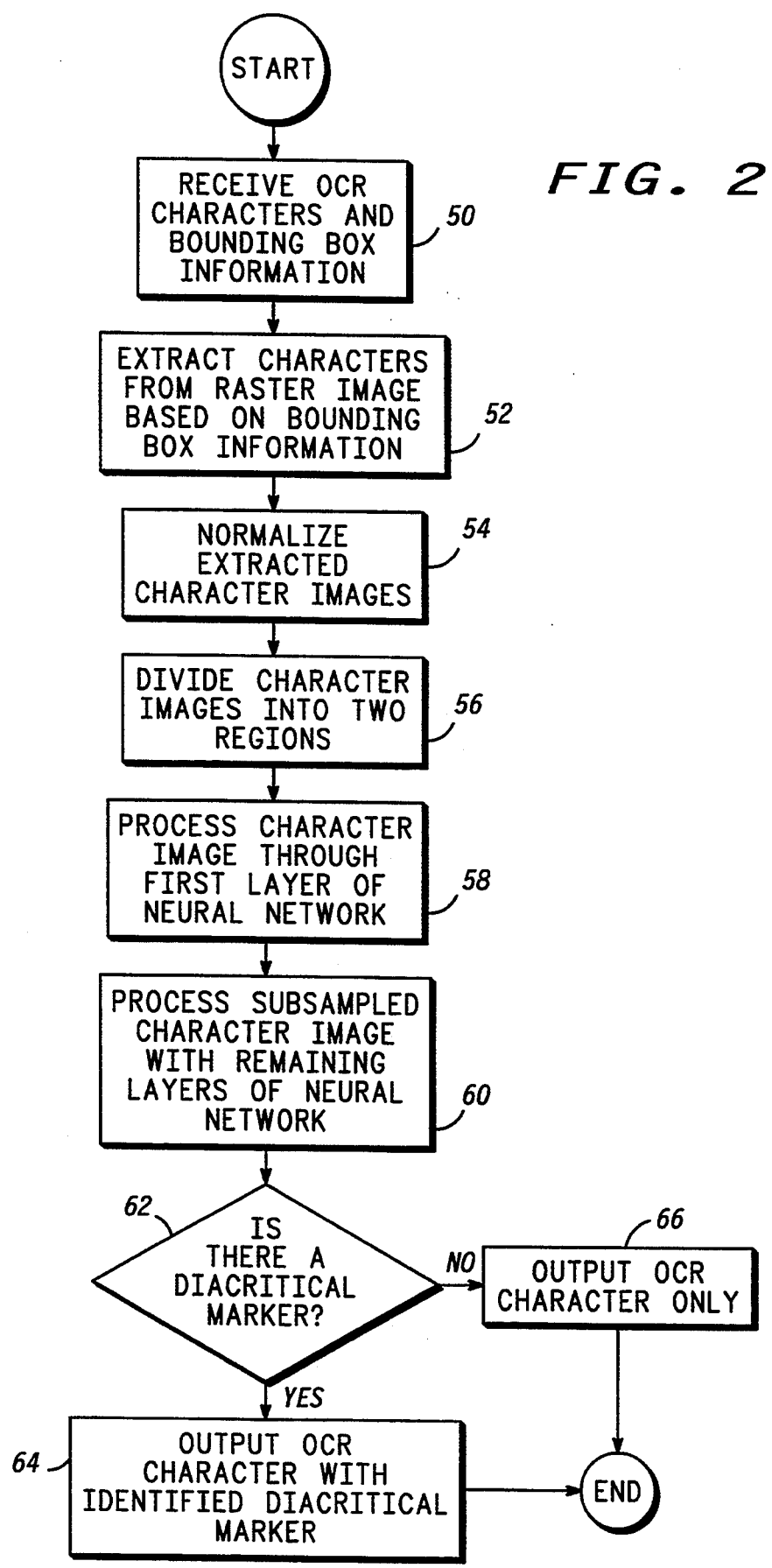
FIG. 2 shows a flowchart of a diacritical marker recognition method in accordance with a preferred embodiment of the invention.

The flowchart shown in FIG. 2 illustrates the method by which DMR system 5 recognizes diacritical markers. Briefly, DMR system 5 receives in step 50 recognized OCR characters from a raster image and bounding box information for each of the characters contained in the raster image. DMR system 5 in step 52 extracts character images from the raster image based on the bounding box information received in step 50. Each of the extracted characters is normalized in step 54 and divided into two regions (e.g., an upper and lower region in step 56. In step 58, DMR system 5 via the first layer of the neural network 18 subsamples the upper and lower regions of each of the character images. DMR system 5 in step 60 then processes the subsampled character images with the other layers of the neural network 18 to determine if a diacritical marker is present in any of the character images. In step 62, DMR system 5 determines whether a diacritical marker exists in a character image or whether no diacritical marker is present with the character image. If DMR system 5 determines that a diacritical marker exists in a particular character image based on the output of neural network 18 and heuristics 20 in step 62, DMR system 5 outputs the identified diacritical marker along with the OCR (ASCII) character in step 64. Otherwise, DMR system 5 outputs in step 66 the OCR (ASCII) character because DMR system 5 determined that a diacritical marker did not exist.

As shown in FIG. 2, DMR system 5 in step 50 receives recognized OCR characters which are recognized from a raster image by OCR engine 10 using conventional and well known OCR techniques. When a character with a diacritical marker is processed by the conventional OCR engine 10, the output character is usually flagged with an uncertain character marker. DMR system 5 also receives in step 50 bounding box information for each character recognized in the raster image from OCR engine 10. A commercially available algorithm provides bounding box information, such as (X,Y,W,H), for example, where X and Y represent where the top left-hand part of the bounding box is located from the top left-hand corner of the raster image, and W (width) and H (height) represent the dimensions of the particular bounding box located at coordinates X and Y. The bounding box information (X,Y,W,H) is provided by OCR engine 10 for each of the characters in the raster image.

Figure 3:
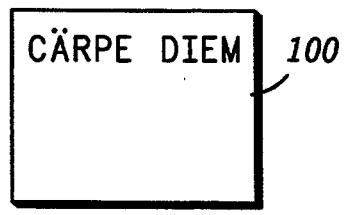
FIG. 3 shows a page of a document containing the words "cärpe diem".
Figure 4:
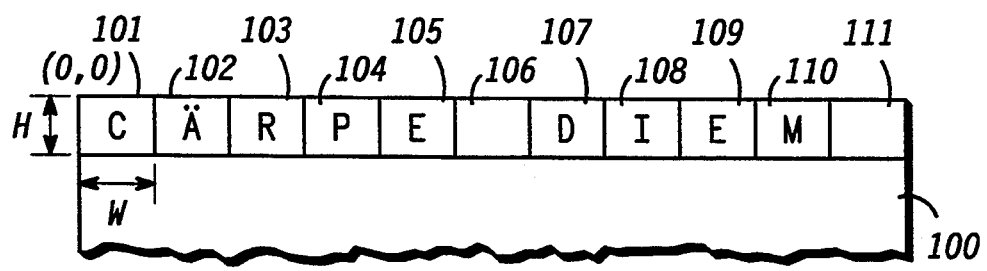
FIG. 4 shows "cärpe diem" segmented into bounding box character images in accordance with a preferred embodiment of the invention.

An illustration of a raster image and bounding box information for each character in a raster image which is received in step 50 is shown in FIGS. 3 and 4. FIG. 3 shows a raster image 100 of a page of a document containing the words "cärpe diem". FIG. 4 shows how OCR engine 10 segments each of the letters in the words "cärpe diem" into bounding boxes 101–111. The bounding box information is used to extract character images from the raster image. The bounding box information comprises the locations and dimensions of each of the boxes 101–111 surrounding each of the letters in "cärpe⌀ diem⌀", where ⌀ is equivalent to a blank space.

An example of the bounding box information provided by OCR engine 10 can be explained by using the character images 101–111 shown in FIG. 4. OCR engine 10 may return (0,0,25,25) for the capitalized letter "C" bounding box 101, (25,0,25,25) for "ä" bounding box 102, and (50, 0, 25, 25) for "r" bounding box 103. Since bounding box "C" 101 is located at the top left-hand corner of the raster image 100, the location of the bounding box or coordinates X and Y are zero and zero, respectively. Similarly, the bounding box coordinates X and Y of "ä" are twenty-five and zero, respectively, meaning that the top left-hand corner of the "ä" bounding box 102 is located twenty-five pixels to the right of and zero pixels down from the top left-hand corner of the raster image 100.

The dimensions of bounding box "C" 101 are twenty-five pixels across and twenty-five pixels high for W and H, respectively. Although the width and height are represented in this example as being twenty-five pixels each, the sizes or dimensions of the bounding boxes depends on the character font (size and style). For example, OCR engine 10 may return thirty pixels for the width and height for Helvetica characters and sixty pixels by seventy pixels for New York characters.

Figure 5:
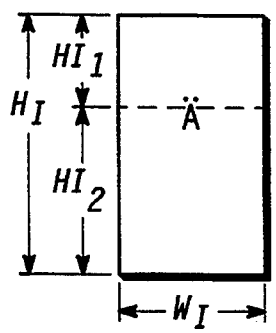
FIG. 5 shows how "ä" is segmented and extracted as a character image and how it is divided into two regions in accordance with a preferred embodiment of the invention.

DMR system 5 via character image extractor and normalizer 16 in step 52 of FIG. 2 extracts character images from the raster image based on the bounding box information received for each of the characters contained in the raster image. For example, DMR system 5 takes the raster image 100 shown in FIG. 4 and extracts each of the character images from the raster image 100 based on bounding box information 101-111. Each of the character images includes character pixels within the bounding box from the raster image. The resulting character image 102 for the letter "ä" is shown in FIG. 5, for example.

After each of the character images has been extracted in step 52, character image extractor and normalizer 16 of DMR system 5 in step 54 normalizes the character image size to ($w_i$, $h_i$), where $w_i$ and $h_i$ represent width and height of the normalized character image in pixels, respectively. Width $w_i$ and height $h_i$ are illustrated in FIG. 5, where $h_i$ includes $h_{i1}$ and $h_{i2}$. Normalization of a character image is needed because the size of the character images varies for different fonts (styles and point sizes). Normalization involves making the size of the character image common for all sizes or dimensions of the character images.

Normalization is accomplished by padding a character image with zeroes if the character image is too small. For example, if the character image is too small in the x direction, normalizer 16 adds a new column of blank pixels (zeroes) as the first column, then another column of blank pixels as the last column. If the character image still needs to be increased in size, columns of blank pixels are alternately added on the front and then the end of the character image until the desired normalized character image size is obtained. Blank pixels can also be added to the top row and bottom row of a character image if the character image is too small in the y direction. If a character image is too large, the character image is cropped or trimmed by alternately removing a first column or row of blank pixels and then removing a last column or row of blank pixels.

Once each of the character images has been extracted from the raster image and normalized by DMR system 5 in steps 52 and 54, DMR system 5 in step 56 then segments the normalized character images into two regions in the vertical direction. The upper region of the character image has the size of ($w_i$, $h_{i1}$) while the lower region of the character image has the size of ($w_i$, $h_{i2}$). For example, the "ä" character image 102 shown in FIG. 5 is divided into two regions in the vertical direction. The reason for dividing the normalized character images into two regions is because neural network 18 processes the upper region of the character image differently from the lower region of the character image. The upper region of the character image should contain the discriminatory information for the diacritical marker, if one exists. The upper region of the "ä" character image 102 shown in FIG. 5 contains the umlaut (" ¨ "), for example.

Figure 6:
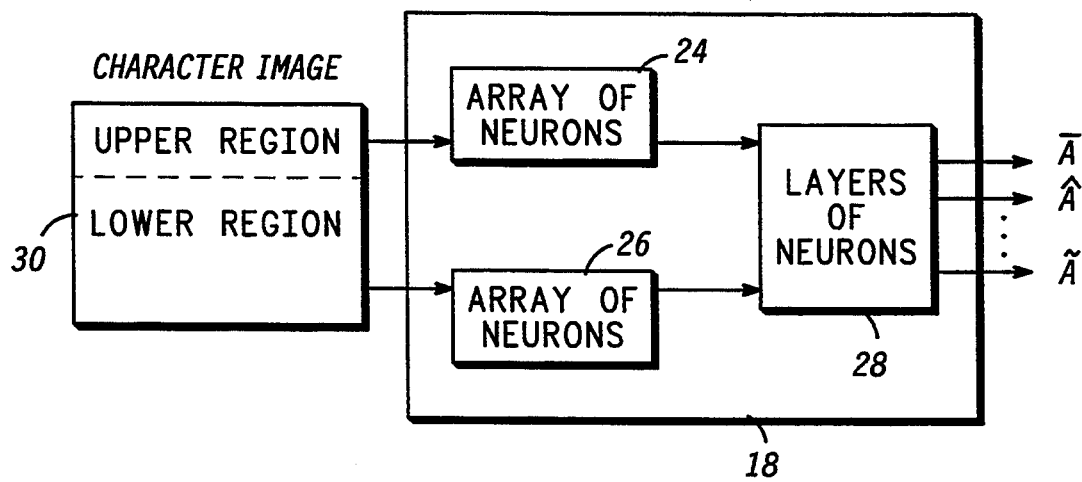
FIG. 6 shows layers of neurons in a neural network in accordance with a preferred embodiment of the invention.

Next in step 58, DMR system 5 via multiple layer subsampling perceptron neural network 18 separately subsamples the upper region and the lower regions of each of the character images output by the character image extractor and normalizer 16. Multiple layer subsampling perceptron neural network 18 is shown in FIG. 6 and comprises a first layer of neurons which includes two neuron arrays 24 and 26 connected to layers of adaptable weight, sigmoidal perceptron neurons 28.

The first layer of the multiple layer subsampling perceptron neural network 18 comprises two neuron arrays 24 and 26. Each of the neurons in the neuron arrays 24 and 26 represents a neighborhood (subsampled region) of sampled pixels from the normalized image, or represents one pixel in the subsampled character image. Each of the neurons in neuron arrays 24 and 26 is a fixed-weight, binary threshhold neuron and is set to a fixed value. The first neuron array 24 is for subsampling neighborhoods of pixels in the upper region of the normalized character image while the second neuron array 26 is for subsampling neighborhoods of pixels in the lower region of the normalized character image.

Each of the neurons in each of the arrays of neurons 24 and 26 is either "on", which is represented as a one, or "off", which is represented as zero. Whether a neuron has a one ("on") or zero ("off") value is determined by summing a number of pixels in a particular neighborhood or subsampling region to see if more than half of the number of pixels in the subsampling region are "on". How particular subsampling regions are chosen is explained in more detail below in relation to the constraint formulae. If half or more than half of the pixels are "on" in a particular subsampling region, the neuron in the subsampled character image assigns itself a value of one. If less than half of the pixels are "on" in a particular subsampling region, the neuron in the subsampled character image assigns itself a value of zero.

Figure 7:
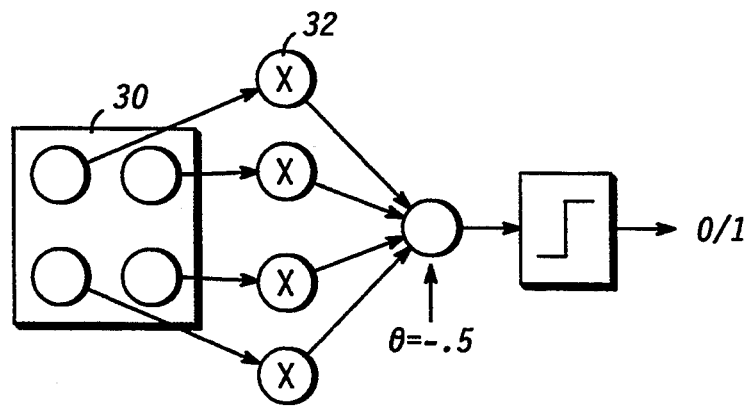
FIG. 7 shows a fixed-weight, binary threshhold neuron in accordance with a preferred embodiment of the invention.

An example of how a particular fixed-weight, binary threshhold neuron in one of the neuron arrays 24 and 26 determines a value for itself is shown in FIG. 7. In FIG. 7, four pixels from a part of normalized character image 30 are being sampled. Each of the four pixels has a value of one ("on") or zero ("off"). Each of the values of the neurons are multiplied by a connection weight by multipliers 32. A connection weight is one divided by the number of pixels being sampled which in this example is equal to one quarter (0.25). The results of the multiplications are added together in adder 34. If the result of the addition is greater to or equal to 0.5, threshhold 36 assigns the neuron (itself) a value of one. If the result of the addition is less than 0.5, threshhold 36 assigns itself a value of zero.

The purpose of the first layer of neurons 24 and 26 is to subsample a normalized character image in the x and y dimensions to a size that can be easily processed by the next layers of neurons 28 in neural network 18. The size of the arrays of neurons which represents the subsampled character image is ($w_s$, $h_s$), where $w_s$ represents a number of neurons in the x direction and $h_s$ represents a number of neurons in the y direction, respectively. The height $h_s$ is equal to $h_{s1}$ plus $h_{s2}$ where $h_{s1}$ represents the number of neurons (subsampled pixels) in the upper region of the subsampled character image and $h_{s2}$ represents the number of neurons (subsampled pixels) in the lower region of the subsampled character image.

Figure 8:
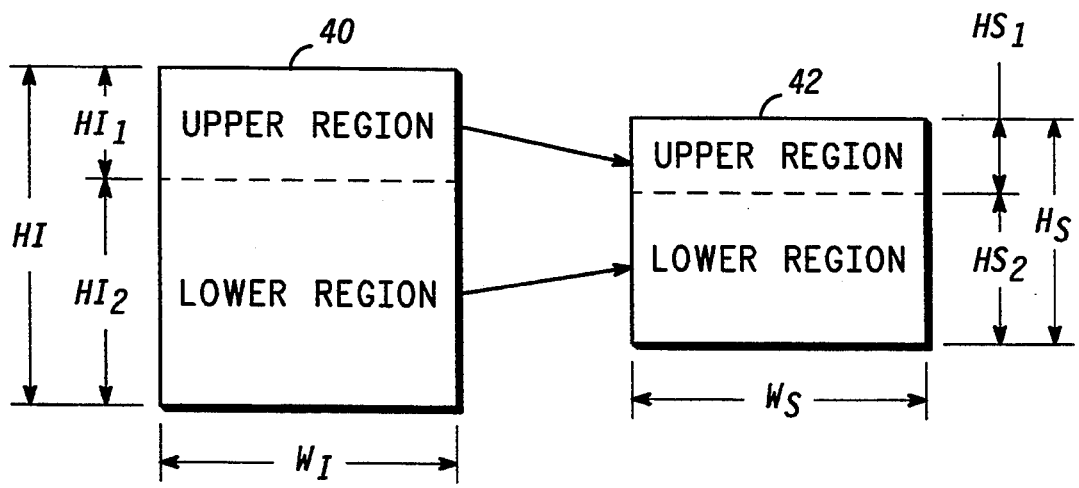
FIG. 8 shows dimensions of a normalized character image and a subsampled character image in accordance with a preferred embodiment of the invention.

As shown in FIG. 8, a normalized character image 40 has a width $w_i$ by a height $h_i$ which is the sum of the upper region height $h_{i1}$ and lower region height $h_{i2}$. After subsampling by the first layer of arrays of neurons 24 and 26, the subsampled character image 42 has a width $w_s$ by height $h_s$, where height $h_s$ is the sum of upper region height $h_{s1}$ and lower region height $h_{s2}$ of the subsampled character image.

The subsampling ratio for the x dimension, $r_x$, is given as:

$$r_x = w_i / w_s \qquad \text{EQ. 1}$$

The subsampling ratio for the upper region of the character image in the y dimension, $r_{y1}$, is given by:

$$r_{y1} = h_{i1}/h_{s1} \qquad \text{EQ. 2}$$

The subsampling ratio for the lower region of the character image in the y dimension, $r_{y2}$, is given by the following equation:

$$r_{y2} = h_{i2}/h_{s2} \qquad \text{EQ. 3}$$

The size of the normalized character image, the vertical and horizontal subsampling ratios, and the size of the subsampled image may be chosen independently, but consistent with the equations given above.

The number of neurons in the first array of neurons 24 is given by the following equation:

$$N_1 = w_s \times h_{s1} \qquad \text{EQ. 4}$$

The array of neurons $N_1$ has $w_s$ neurons in the x direction and $h_{s1}$ neurons in the y direction. The number of neurons in the second array of neurons is given by the following equation:

$$N_2 = w_s \times h_{s2} \qquad \text{EQ. 5}$$

The array of neurons $N_2$ has $w_s$ neurons in the x direction and $h_{s2}$ neurons in the y direction.

Once the number of neurons in each of the arrays is determined from equations 4 and 5, a connection weight which is multiplied by the value of a particular pixel must be determined, as well as what pixels are part of a subsampling region or neighborhood. The connection weights arrays of neurons 24 and 26 are not trained as they are in the later layers 28 of the neural network 18. The connection weights to neuron $N_{i,j}$ from all pixels (r,c) in the upper region of the character image which satisfies the following constraint:

$$\{(r,c) \mid r=(i)(r_{y1})+m;\ c=(j)(r_x)+n;\ m \in (0, r_{y1}-1), n \in (0, r_x-1)\}$$

are set to the following:

$$\text{connection weight}_{r,c} = 1/r_x(r_{y1})$$

The constraint formula identifies which of the pixels in the normalized character image are multiplied by the connection weight$_{r,c}$. In the constraint formula, r represents rows while c represents columns. The combination of (r, c) specifies pixels by the row and column designation.

The connection weights to neuron $N_{i,j}$ for all pixels (r,c) in the lower region of the character image which satisfies the following constraint:

$$\{(r,c) \mid r=(i)(r_{y2})+m;\ c=(j)(r_x)+n;\ m \in (0, r_{y2}-1), n \in (0, r_x-1)\}$$

are set to the following:

$$\text{connection weight}_{r,c} = 1/r_x(r_{y2})$$

The pixels identified by the second constraint formula in the (r, c) set are multiplied by the second connection weight equation.

Figure 9:
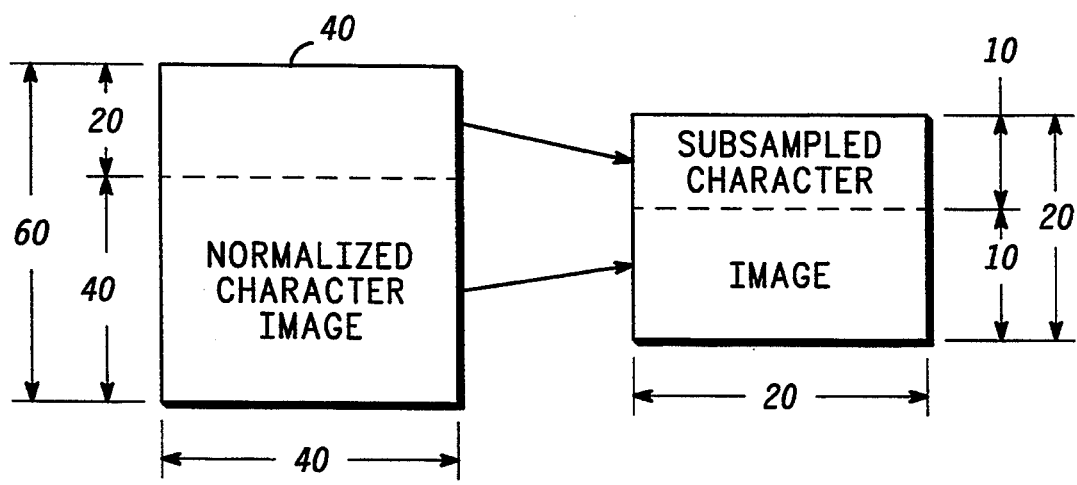
FIG. 9 show a normalized character image and subsampled character image, each of which has dimensions according to a preferred embodiment of the invention.

An example of how equations 1-5, constraint formulae and connection weight equations are used in subsampling a character image is given as follows. Suppose that normalized character image 40 shown in FIG. 8 has a width $w_i$ equal to 40 pixels while having a height $h_i$ of 60 pixels, where 20 pixels is equal to height $h_{i1}$ while 40 pixels is the height $h_{i2}$. Further suppose the desired subsampled character image 42 shown in FIG. 8 has a width $w_s$ equal to 20 pixels, while having a height $h_s$ of 20 pixels, where height $h_{s1}$ and $h_{s2}$ equals 10 pixels each. The dimensions of the normalized character image 40 and the subsampled character image 42 are shown in FIG. 9.

Once the dimensions of a normalized character image 40 and subsampled character image 42 are determined, $r_x$, $r_{y1}$, and $r_{y2}$ are determined from equations 1, 2, and 3, respectively, as follows:

$$r_x = w_i/w_s = 40/20 = 2$$

$$r_{y1} = h_{i1}/h_{s1} = 20/10 = 2$$

$$r_{y2} = h_{i2}/h_{s2} = 40/10 = 4$$

The number of neurons in neuron arrays $N_1$ and $N_2$ are determined from equations 4 and 5, respectively, as follows:

$$N_1 = w_s \times h_{s1} = 20 \times 10 = 200$$

$$N_2 = w_s \times h_{s2} = 20 \times 10 = 200$$

Therefore, each of neuron arrays $N_1$ and $N_2$ in the first neuron layer has 200 fixed-weight, binary threshhold neurons arranged in a 20 by 10 matrix array (i.e., 20 neurons in x direction, 10 neurons in y direction). The first layer of neural network 18 therefore comprises 400 neurons (i.e., 20 neurons in x direction by 20 or (10+10) neurons in the y direction). The connection weights to neuron $N_{i,j}$ from all pixels (r,c) in the upper region of the normalized character image satisfying the constraint:

$$\{(r,c) \mid r=(i)(r_{y1})+m;\ c=(j)(r_x)+n;\ m \in (0, r_{y1}-1),\ n \in (0, r_x-1)\}$$

$$\{(r,c) \mid r=(i)(2)+m;\ c=(j)(2)+n;\ m \in (0,1),\ n \in (0,1)\}$$

are set to $$\text{connection weight } N_1 = 1/r_x(r_{y1}) = 1/2(2) = 1/4$$

Therefore, the constraint formula identifies pixels in the normalized character image which are multiplied by connection weight (0.25) for neuron $N_{i,j}$. I and j for neuron $N_{i,j}$ start from base (0,0) or i can equal 0 and j can equal 0.

An example of how the constraint formula determines which pixels are being sampled for each neuron $N_{i,j}$ is given below. The pixels in the normalized character image for neuron $N_{1,1}$ (i=1 and j=2) in the upper region of the character image:

$$\{(r,c) \mid r=(i)(2)+m;\ c=(j)(2)+n;\ m \in (0,1),\ n \in (0,1)\}$$

$$\{(r,c) \mid r=(1)(2)+m;\ c=(2)(2)+n;\ m \in (0,1),\ n \in (0,1)\}$$

$$r = 2+0 = 2;\ \text{and}$$

$$= 2+1 = 3$$

$$c = 4+0 = 4;\ \text{and}$$

$$= 4+1 = 5;$$

(r,c)=(2,4), (2,5), (3,4), (3,5)

Therefore, as shown in FIG. 10, neuron $N_{1,2}$ samples the pixels enclosed in box 34, multiplies the value of the pixel by the connection weight, sums the results of the multiplications and gives neuron $N_{1,3}$ the value of one if two or more pixels from the normalized character image 40 are "on" or have the value of one.

Similarly, the connection weight to each of the neurons $N_{i,j}$ in the lower region neuron array $N_2$ from all pixels (r, c) from the lower region of the normalized character image satisfying the following constraint:

$$\{(r,c) \mid r=(i)(r_{y2})+m;c=(j)(r_x)+n;m \in (0,r_{y2}-1), n \in (0,r_{x-1})\}$$

$$\{(r,c) \mid r=(i)(4)+m;c=(j)(2)+n;m \in (0,3), n \in (0,1)\}$$

are set to $$\text{connection weight}_{r,c}=1/r_x(r_{y2})=1/2(4)=1/8$$

Subsampling reduces pixel information and dimensionality of the overall character image, while maintaining a disproportionate amount of information content in the upper region of the character image. The resulting distortion in the reduced or subsampled character image is beneficial for processing the subsampled character image through neural network 18.

Returning to FIG. 2, once the character image has been subsampled by the first layer of neurons in step 58, the result of neuron arrays 24 and 26 is processed in step 60 by multilayer perceptron neural network 28 which is part of DMR system 5. Neural network 28 is a conventional multilayer perceptron neural network, such as packages available in the public domain or commercially available packages Genesis or PlaNet, for example. Neural network 28 is trained with a well known learning rule called Backward Error Propagation. The topology of multilayer perceptron neural network 28 is a three-layer full-connected network with $N_1+N_2$ input-layer neurons, 50 hidden-layer neurons, and 8 output-layer neurons. The input-layer is a layer of fanout, distribution nodes that do not have adaptable weights or squashing functions. Each of the 450 input-layer neurons are connected to each of the neurons in the first layer of neuron arrays 24 and 26. Hyperbolic tangent functions are used for the nonlinear squashing functions in the hidden and output layers. The number of hidden layer neurons 28 was derived experimentally for a particular set of subsampling parameters.

Neural network 28 is trained on a sample with a diacritical marker frequency distribution consistent with the document class that is being converted. For the case of the prototype system the document class was electronic data manuals which included digital and memory components. This results in a neural network that does not respond with a diacritical marker assertion on every character, but with a frequency with which diacritical markers occur in the document. Statistical analysis of several instance documents from the electronic data manual class suggested that the macron diacritical marker ("¯") occurred most frequently at a rate of approximately once every 50 characters. The circumflex ("^") and the vector marker were found to occur approximately once every 600 characters.

The output of multilayer perceptron neural network 28 has one line connected to character recognition controller 12 for each of the diacritical markers being recognized as shown in FIG. 1. A minus one (−1) on an output line represents that no diacritical marker is determined by neural network 18 to be present in a character image. A plus one (+1) output by multilayer perceptron neural network 18 on the output line corresponds to a possible diacritical marker found in the character image. When a character with a diacritical marker is processed by a conventional OCR engine, such as OCR engine 10 shown in FIG. 1, the output character is usually flagged with an uncertain character marker. If one of the diacritical marker outputs from the neural network 18 in DMR system 5 is +1, it indicates the possible presence of a diacritical marker.

Returning to FIG. 2, once character recognition controller 12 receives the determination by neural network 18 whether a diacritical marker may exist, controller 12 of DMR system 5 determines in step 60 whether a diacritical marker does in fact exist by using heuristics 20 and the probability that one exists as provided by neural network 18. Heuristics 20 are used by the character recognition controller 12 to eliminate errors in the recognition of a diacritical marker by neural network 18. For example, heuristics would discard the diacritical marker when the "dot above" diacritical marker is an "i" or "j", or when the macron " " is a capitalized "J", "L" or "U". If DMR system 5 determines that a diacritical marker exists using heuristics 20 in step 62, then DMR system 5 marks and outputs the OCR (ASCII) character in step 64 as having the identified diacritical marker. Otherwise, DMR system 5 in step 66 just outputs the OCR (ASCII) character because no diacritical marker was recognized for this particular OCR character.

It will be appreciated by those skilled in the art that the disclosed diacritical recognition system and method adds significant value to an optical character recognition system by recognizing diacritical markers. Moreover, since the DMR system 5 is an addition to the conventional OCR engine 10, the diacritical marker recognition system and method recognizes diacritical markers without negatively impacting the recognition rate of the normal characters a–z and A–Z, digits 0–9, and punctuation marks.

Accordingly, it is intended by the appended claims to cover all modifications of the invention which fall within the true spirit and scope of the invention.

What is claimed is:

1. A diacritical marker recognition system which is connectable to receive a raster image and bounding box information, said bounding box information specifying locations and dimensions of a rectangle surrounding characters in said raster image, said diacritical marker recognition system comprising:

extraction means for extracting a plurality of character images from said raster image based on said bounding box information;

subsampling means for subsampling an upper and lower region of each of said extracted character images, the subsampling in the upper region occurring at a different rate than the subsampling in the lower region;

neural network means for determining a probability of whether a diacritical marker may exist in each of said subsampled character images; and controller means for determining whether a diacritical marker exists in one of said character images based on said determining by said neural network means and heuristics.

2. A diacritical marker recognition system as recited in claim 1, wherein said extraction means includes normalization means for normalizing each of said character images to a standard character image size.

3. A diacritical marker recognition system as recited in claim 1, wherein each of said character images includes a plurality of pixels, and wherein said subsampling means includes a second neural array means for subsampling said pixels in upper and lower regions of each of said normalized character images.

4. A diacritical marker recognition system which is connectable to receive a raster image and bounding box information, said bounding box information specifying locations and dimensions of a rectangle surrounding characters in said raster image, said diacritical marker recognition system comprising:

extraction means for extracting a plurality of character images from said raster image based on said bounding box information;

first neural array means for subsampling an upper and lower region of each of said extracted character images, the subsampling in the upper region occurring at a different rate than the subsampling in the lower region;

second neural array means for determining a probability of whether a diacritical marker may exist in each of said subsampled character images; and controller means for determining whether a diacritical marker exists in said character image based on said determining by said second neural array means and heuristics.

5. A diacritical marker recognition method executed on a computer as part of a computer program for identifying if any character in a raster image contains a diacritical marker, said computer connectable to receive a raster image and bounding box information, said bounding box information specifying locations and dimensions of a rectangle surrounding each character in said raster image, said method comprising the steps of:

(a) extracting a plurality of character images from said raster image based on said bounding box information;

(b) subsampling an upper and lower region each of said extracted character images, the subsampling in the upper region occurring at a different rate than the subsampling in the lower region;

(c) identifying if any of said subsampled character images has a diacritical marker by using a neural network; and (d) outputting said diacritical marker if said diacritical marker is identified in step (c).

6. A diacritical marker recognition method as recited in claim 5, wherein step (a) comprises the step of:

(a1) normalizing each of said character images to a standard character image size.

7. A diacritical marker recognition method as recited in claim 5, wherein step (b) comprises the step of:

(b1) subsampling an upper and lower region of each of said extracted character images.

8. A diacritical marker recognition method as recited in claim 5, wherein step (b) comprises the step of:

(b1) subsampling an upper and lower region of each of said extracted character images using neurons.

9. A diacritical marker recognition method as recited in claim 5, wherein step (b) comprises the step of:

(b1) subsampling an upper and lower region of each of said extracted character images using fixed-weight, binary threshhold neurons.

10. A diacritical marker recognition method as recited in claim 5, wherein step (c) comprises the step of:

(c1) identifying if any of said subsampled character images has a diacritical marker by using said neural network and heuristics.

11. A diacritical marker recognition method executed on a computer as part of a computer program for identifying if any character in a raster image contains a diacritical marker, said computer connectable to receive a raster image and bounding box information, said bounding box information specifying locations and dimensions of a rectangle surrounding each character in said raster image, said method comprising the steps of:

(a) extracting a plurality of character images from said raster image based on said bounding box information;

(b) normalizing each of said character images to a standard character image size;

(c) using a first neuron array to subsample an upper region of each of said normalized character images;

(d) using a second neuron array to subsample an lower region of each of said normalized character images, the subsampling in the upper region occurring at a different rate than the subsampling in the lower region;

(e) identifying if any of said subsampled character images from said first and second neuron arrays has a diacritical marker by using a neural network and heuristics; and (f) outputting said diacritical marker if said diacritical marker is identified in step (e).

* * * * *